2,793,935

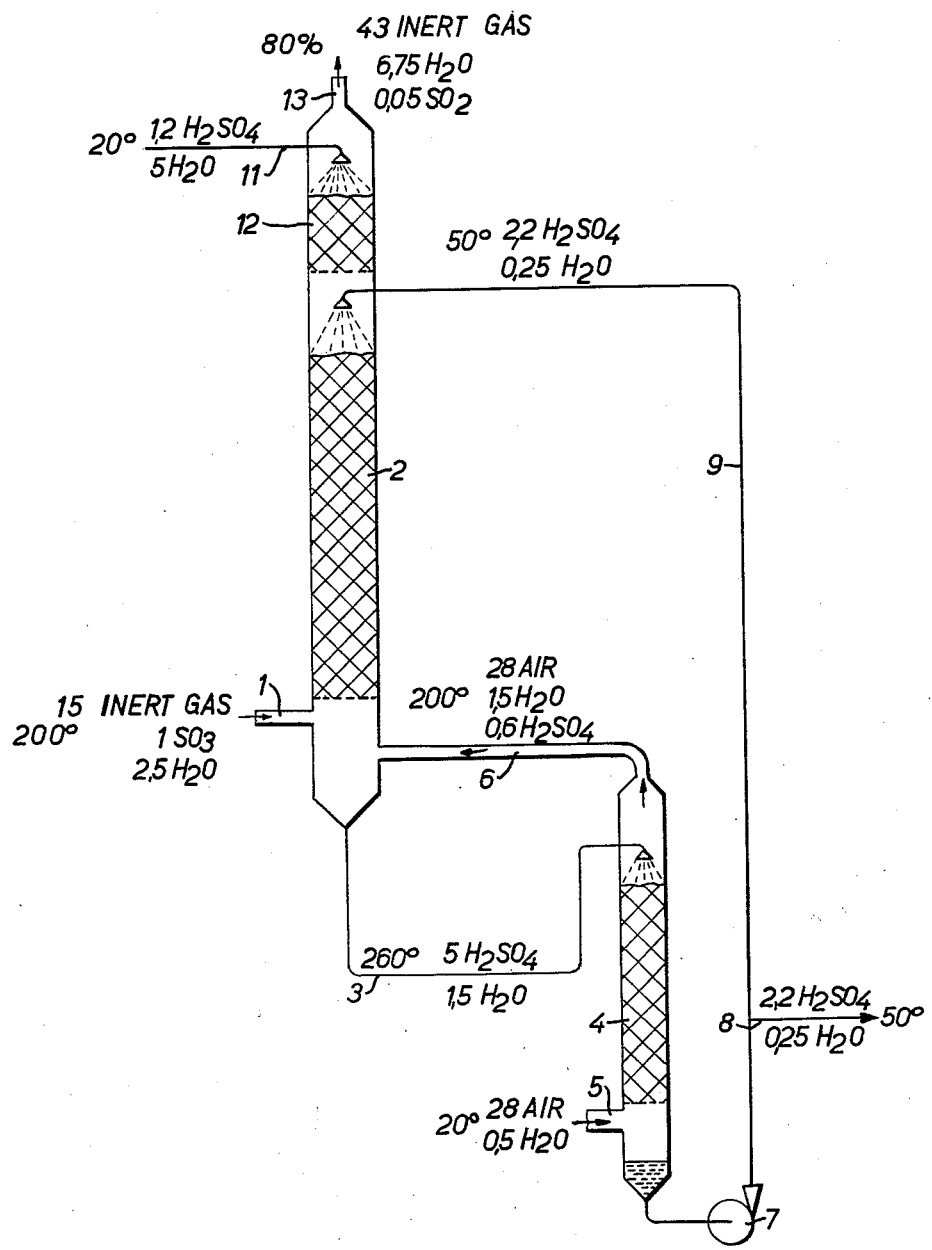

Patented May 28, 1957

2,793,935

MANUFACTURE OF SULFURIC ACID

Alfred Haltmeier, Leverkusen-Bayerwerk, Germany, assignor to Farbenfabriken Bayer Aktiengesellschaft, Leverkusen, Germany, a corporation of Germany Application November 10, 1954, Serial No. 468,100

Claims priority, application Germany November 13, 1953

1 Claim. (Cl. 23—167)

The present invention relates to a new process for the manufacture of sulfuric acid.

In my copending application Ser. No. 163,817, filed May 24, 1950, now Patent No. 2,730,431, I have described a process for the production of sulfuric acid by absorption of sulfur trioxide in sulfuric acid at a temperature higher than 150° C., the hot sulfuric acid which is formed being cooled by means of air. Since dense fumes are formed during this cooling stage, the air containing the fumes is washed with hot sulfuric acid having a water content higher than that of the cooled acid. Preferably, in order to effect this washing operation, the air containing fumes which comes from the cooling stage is admixed with the absorber gases at a stage where the latter gases have already yielded up the major part of their sulfur trioxide content to the absorbing acid.

I have now found that the process of my copending specification Ser. No. 163,817, now Patent No. 2,730,431, may be modified so as to eliminate the fumes formed when the hot sulfuric acid is cooled by air, by admixing the air containing the fumes with the gases containing sulfur trioxide before the latter reach the absorption stage. It has surprisingly been found that the absorption is not impaired, as was to be feared, by the gases containing sulfur trioxide being diluted and having fumes admixed therewith.

One embodiment of the process of the invention will now be described by way of example with reference to the accompanying drawing, the single figure of which shows diagrammatically an absorption system suitable for carrying out the process.

Gases containing sulfur trioxide and consisting, for example, of 1 mol of $SO_3$, 0.05 mol of $SO_2$, 2.5 mols of $H_2O$ vapor and 15 mols of inert gas, enter the absorber 2 through the pipe 1 and are washed in the said absorber with hot sulfuric acid. The acid, containing 5 mols of $H_2SO_4$ and 1.5 mols of $H_2O$, leaves the washing process at a temperature of, for example, 260° C. and passes by way of the pipe 3 into the cooler 4, in which it is cooled with air. The cooling air, consisting for example of 22 mols of nitrogen, 6 mols of oxygen and 0.5 mol of water vapor, enters via the pipe 5 at a temperature of, for example, 20° C. After absorbing heat and acid vapors, the air, which now contains 22 mols of nitrogen, 6 mols of oxygen, 1.5 mols of water vapor and 0.6 mol of sulfuric acid vapor, and is at a temperature of 200° C., is introduced by way of the pipe 6 into the absorber gases before the latter reach the absorption stage. The acid leaving the cooler 4 has a temperature of 50° C. and consists of 4.4 mols of $H_2SO_4$ and 0.5 mol of $H_2O$. It is removed from the cooler by a pump 7. Some of this acid, for example, 2.2 mols of $H_2SO_4$ with 0.25 mol of $H_2O$, is withdrawn from the system by way of the pipe 8 as the final product. The remainder, that is, 2.2 mols of $H_2SO_4$ and 0.5 mol of $H_2O$, is returned to the absorber by way of the pipe 9. The water needed to combine with the $SO_3$ must be introduced at a suitable point. In the present example, it is introduced via the pipe 11 in the form of dilute waste acid containing 1.2 mols of $H_2SO_4$, 5 mols of $H_2O$ and at a temperature of 20° C., and serves first for a final washing of the waste gases in the packing 12 before these gases leave the system at a temperature of, for example, 80° C., through the discharge pipe 13. The waste gases consist of 43 mols of inert gases, 6.75 mols of $H_2O$ vapor and 0.05 mol of $SO_2$.

I claim:

In the process for the production of sulfuric acid, in which gases containing sulfur trioxide are contacted with sulfuric acid at a temperature greater than 150° C., and thereafter the hot sulfuric acid formed is cooled with air, the improvement which comprises admixing the air from the cooling containing sulfuric acid fumes with the gases containing sulfur trioxide being passed to said contacting.

References Cited in the file of this patent

UNITED STATES PATENTS 1,832,490    Leverett et al. _____ Nov. 17, 1931

OTHER REFERENCES

Lunge: Sulphuric Acid and Alkali, vol. 1, part 2, 4th ed., page 835, Gurney and Jackson, 33 Paternoster Row, London, 1913.